United States Patent

Friedman et al.

[11] Patent Number: 6,039,990
[45] Date of Patent: Mar. 21, 2000

[54] VACUUM PROCESSED FISH PRODUCT IN A TOMATO BASE COOKING SAUCE

[76] Inventors: Saloman Friedman; Chava Friedman, both of 12 Israel Zupnick Dr. Unit 201, Monroe, N.Y. 10950

[21] Appl. No.: 09/119,903

[22] Filed: Jul. 21, 1998

[51] Int. Cl.[7] .............................. A21D 10/02; B65D 85/08
[52] U.S. Cl. .................... 426/129; 426/574; 426/589; 426/643; 426/404; 426/407; 426/131
[58] Field of Search ................................... 426/574, 129, 426/404, 407, 589, 643, 131

[56] References Cited

U.S. PATENT DOCUMENTS

| | | | |
|---|---|---|---|
| 3,812,268 | 5/1974 | Corey et al. | 426/146 |
| 4,172,153 | 10/1979 | Zetherstrom et al. | 426/332 |
| 4,393,090 | 7/1983 | Coroneos | 426/646 |
| 4,557,942 | 12/1985 | Goodman | 426/574 |
| 4,597,974 | 7/1986 | Fonteneau et al. | 426/129 |
| 4,778,689 | 10/1988 | Toyota et al. | 426/537 |
| 4,798,728 | 1/1989 | Sugisawa et al. | 426/129 |
| 4,931,299 | 6/1990 | Assing-Collier | 426/325 |
| 4,937,089 | 6/1990 | Ikoma et al. | 426/574 |
| 4,963,370 | 10/1990 | Uchida et al. | 426/7 |
| 5,260,083 | 11/1993 | Brain et al. | 426/573 |
| 5,846,594 | 12/1998 | Zimmerman et al. | 426/643 |
| 5,863,578 | 1/1999 | Guarino | 426/113 |

OTHER PUBLICATIONS

Baked Gefilte Fish Recipe and Baked Gefilte Fish II, Jewish Food Recipe Archives, http://www.eskimo.com/jeffrec/recipes copyright Feb. 1, 1996.

*Primary Examiner*—Nina Bhat
*Attorney, Agent, or Firm*—Helfgott & Karas, PC.

[57] ABSTRACT

A fish product is packed in a tomato base sauce which is specifically formulated to withstand the high temperatures of vacuum sealing. In order to avoid any degradation in flavor of the fish product and the sauce, and particularly to avoid the occurrence of a burnt taste in the fish product and the sauce, the amounts of sugar, salt and white pepper in both the fish product and the sauce are maintained within close limits.

16 Claims, No Drawings

VACUUM PROCESSED FISH PRODUCT IN A TOMATO BASE COOKING SAUCE

BACKGROUND OF THE INVENTION

1. Field of the Invention

The present invention relates in general to a vacuum-packed fish product and relates in particular to vacuum-packed gefilte fish processed and vacuum-packed in a tomato base admixture.

2. Description of Prior Developments

Gefilte fish is a well known food product commercially available in numerous formulations. It is available as a fresh product, frozen product or as a sealed and vacuum-packed product. Typically, when it is sealed and vacuum-packed, it is immersed in a sauce or suspended in a gelled liquid.

According to conventional thought and experience, it has not been possible to satisfactorily vacuum pack gefilte fish in a tomato base sauce. The reason for this is that during the vacuum sealing process, the temperature of the fish product and its packing liquid or sauce is raised to a temperature of at least about 250 degrees Fahrenheit, and in many cases even higher.

As a result, all known prior attempts to vacuum pack minced fish products, such as gefilte fish, in a tomato base liquid or sauce have produced an undesirable burnt taste which has been found unacceptable to most palates. The high vacuum packing temperatures apparently cause a reaction in at least some of the ingredients in the fish product and/or the sauce so that one or more ingredients produce an undesirable burnt flavor.

Accordingly, a need exists for a method of processing gefilte fish in a tomato base sauce using a high temperature vacuum sealing process without producing a burnt flavor in the tomato base sauce or in the fish product.

A further need exists for a minced fish composition of the gefilte fish variety which, when vacuum packed at high temperatures, does not react with one or more components in the packing sauce to the point where a burnt flavor is produced in the fish product and/or its packing sauce.

SUMMARY OF THE INVENTION

The present invention has been developed to fulfill the needs noted above and therefore has as an object the provision of a vacuum-packed fish product provided in a flavorful tomato base sauce.

Another object of the invention is the provision of a gefilte fish product processed with carefully controlled proportions of specific ingredients in order to avoid the occurrence of a burnt taste in a tomato base sauce.

Still another object of the invention is the provision of a minced and compacted vacuum packed fish product having predetermined critical amounts of sugar, salt and white pepper combined with additional processing ingredients in such amounts as to avoid the creation of a burnt taste in a tomato base packing sauce.

These and other objects are met by the present invention which is directed to a method and composition for producing a pleasant-tasting flavorful fish product which is vacuum packed in a tomato base sauce. The composition of the tomato base sauce is critically controlled to enable the sauce to withstand the higher temperatures and heat of vacuum sealing while retaining its fresh tomato flavor. The relative amounts of sugar, salt and white pepper in the sauce are carefully set and controlled in order to enable the tomato base sauce to undergo vacuum sealing without producing an unappealing charred or burnt taste.

In addition to controlling the amounts of sugar, salt and white pepper in the tomato sauce, it is also important to control the amount of these same constituents in the fish composition as well. That is, it has been observed that a co-action or interaction between the composition of the fish mixture and the composition of the tomato base sauce can either enhance or detract from the resulting flavor of the vacuum-sealed products.

According to the invention, by carefully controlling the relative amounts of sugar, salt and white pepper in the initial fish mixture as well as in its tomato base cooking sauce, not only can the resulting food product avoid taste deterioration during high temperature processing, it can also result in a gefilte fish product having a flavor comparable to or better than those using processes other than vacuum sealing.

The aforementioned objects, features and advantages of the invention will, in part, be pointed out with particularity, and will, in part, become obvious from the following more detailed description of the invention.

DETAILED DESCRIPTION OF THE PREFERRED EMBODIMENTS

The present invention will now be described in conjunction with several representative examples of a minced fish admixture processed in a tomato base liquid or sauce. The amounts of sugar, salt and white pepper are carefully preselected and maintained to allow the resulting fish and sauce product to be vacuum packed at high temperatures without any noticeable deterioration in taste.

EXAMPLE 1

Fish Mixture

To begin with, a fish mixture is produced using the following constituents or components, each of which may vary within a tolerance of at least about plus or minus ten percent by weight without departing from the invention.

| Constituent | % by Weight | Acceptable Range |
|---|---|---|
| 63 lbs fish | 48.03% | 43.0% to 53% |
| 16 lbs eggs | 12.20% | 11.0% to 13% |
| 12 ½ lbs. onions | 9.53% | 8.5% to 10.5% |
| 8 lbs oil (vegetable) | 6.10% | 5.5% to 6.5% |
| 7 lb matzo meal | 5.33% | 4.5 to 6.5% |
| 10 lbs. sugar | 7.62% | 7.0% to 8.0% |
| 12 lbs. water | 9.15% | 8.0% to 10.0% |
| 2 lbs. salt | 1.52% | 1.0% to 2.0% |
| 0.50 lbs potato starch | 0.38% | 0.30% to 0.50% |
| 0.16 lbs white pepper | 0.12% | 0.10% to 0.15% |

The type of fish used can vary, but a preferred choice is 100% chopped, diced, minced or ground mullet. It is also possible to use a mixture of carp and mullet in virtually any relative amounts. However, a mixture of about 50% carp (31½ lbs) and 50% mullet (31½ lbs.) is preferred, insofar as this mixture provides a most pleasant flavor and texture. It is preferred to provide the fish in the form of boneless fillets prior to chopping, mincing, grinding or dicing. It is acceptable to substitute cottonseed oil for the vegetable oil or to use a blend of cottonseed oil and vegetable oil.

EXAMPLE 2

Fish Mixture

In some cases, the 7 lbs of matzo meal can be replaced with 6 lbs of potato starch without adversely affecting the flavor of the final product. In this case the following fish mixture results:

| Constituent | % by Weight | Acceptable Range |
| --- | --- | --- |
| 63 lbs fish | 48.59% | 43.0% to 53% |
| 16 lbs eggs | 12.34% | 11% to 13% |
| 12 ½ lbs onions | 9.64% | 8.5% to 10.5% |
| 8 lbs oil (vegetable) | 6.17% | 5.5% to 6.5% |
| 6 lbs potato starch | 4.63% | 3.5% to 6.5% |
| 10 lbs sugar | 7.71% | 7.0% to 8.5% |
| 12 lbs water | 9.26% | 8.0% to 10.5% |
| 2 lbs salt | 1.54% | 1.0% to 2.0% |
| 0.16 lb white pepper | 0.12% | .10% to 0.15% |

The most critical ingredients affecting the flavor of the final vacuum-packed product are the sugar, salt, and white pepper in the fish mixtures as listed above as well as in the tomato base sauce mixtures as listed below. For example, using the fish mixture of fish of Example 1 above with the sauce mixture Example 1 below, the 7.62% by weight of sugar, 1.52% by weight of salt and 0.12% by weight of white pepper in the fish product mixture, when combined with the 5.95% by weight of sugar, 0.7% by weight of salt and 0.035% by weight of white pepper in the sauce and processed in combination with the remaining components in the fish mixture and sauce, results in a gefilte fish product which can be vacuum sealed in a tomato base sauce without producing a burnt, charred or spoiled taste.

Either of the fish mixture examples listed above can be used with any of the sauce mixtures listed below to yield a gefilte fish product which can be vacuum sealed in a tomato base sauce without producing a burnt, charred or spoiled taste.

Prior to vacuum sealing, the fish mixture is cooked for about 30 to 45 minutes at a low temperature by simmering in a tomato base sauce having a composition such as represented by the sauce mixtures set forth below.

EXAMPLE 1

Sauce

A tomato base sauce composition which can be used effectively in practicing the invention is formulated as follows:

| Constituent | % by Weight | Acceptable Range |
| --- | --- | --- |
| 20 lbs water | 86.95% | 80% to 90% |
| 1.39 lbs tomato paste | 6.032% | 5.0% to 7.0% |
| 1.40 lbs sugar | 6.09% | 5.0% to 7.0% |
| .20 lb salt | 0.87% | 0.50% to 1.50% |
| .011 lb garlic powder (1.4 tsp) | 0.048% | 0.030% to 0.070% |
| .0029 lb white pepper (.25 tsp) | 0.012% | 0.006% to 0.018% |

EXAMPLE 2

Sauce

Another tomato base sauce composition which can be used effectively in practicing the invention is formulated as follows:

| Constituent | % by Weight | Acceptable Range |
| --- | --- | --- |
| 20 lbs water | 84.151% | 80% to 90% |
| 1.75 lbs tomato paste | 7.363% | 6.5% to 8.5% |
| 1.75 lbs sugar | 7.363% | 6.5% to 8.5% |
| .25 lb salt | 1.052% | 0.5% to 1.5% |
| .01367 lb garlic powder (1.75 tsp) | 0.058% | 0.03% to 0.10% |
| .00318 lb white pepper (0.50 tsp) | 0.013% | 0.006% to 0.02% |

The tomato paste component of Examples 1 and 2 consists only of pure pressed tomatoes. As suggested by the acceptable range, in each of the sauces of sauce Examples 1 and 2, the amount of each constituent can vary by at least about plus or minus 10% from the amount listed without departing from the invention.

The fish mixture of Example 1 may be formed and compacted into small balls or other shapes and cooked in any one of the cooking sauces of Examples 1 or 2 for 30 to 45 minutes at a slow boil, i.e. typically at a temperature from about 200 degrees Fahrenheit to about 220 degrees Fahrenheit. In some cases cooking temperatures can reach 250° Fahrenheit, or more. The fish product and the cooking sauce are then placed in vacuum sealable containers such as glass jars and subjected to any one of many well known vacuum sealing methods.

By maintaining the amounts of sugar, salt and white pepper in the fish mixture and sauce within the ranges specified above, the resulting fish product and the tomato base sauce do not exhibit any discernable burnt or charred taste or any degradation in flavor due to the high temperatures of vacuum sealing.

There has been disclosed heretofore the best embodiment of the invention presently contemplated. However, it is to be understood that the various changes and modifications may be made thereto without departing from the spirit of the invention.

What is claimed is:

1. A vacuum-packed fish product provided in a tomato base cooking sauce processed at high temperature and comprising, by weight percent:

fish 43% to 53%;
egg 11% to 13%;
onion 8.5% to 10.5%;
oil 5.5% to 6.5%;
matzo meal 4.5% to 6.5%;
sugar 7.0 to 8.0%;
water 8.0% to 10.0%;
salt 1.0% to 2.0%;
potato starch 0.30% to 0.50%; and
white pepper 0.10% to 0.15%.

2. The vacuum-packed fish product of claim 1, wherein said fish product consists essentially of, by approximate weight percent:

fish 48.03%;
egg 12.20%;
onion 9.53%;
oil 6.10%;
matzo meal 5.33%;
sugar 7.62%;
water 9.15%;
salt 1.52%;
potato starch 0.38%; and white pepper 0.12%.

3. The vacuum-packed fish product of claim 1, wherein said tomato base cooking sauce comprises by weight percent:
- water 80% to 90%;
- tomato paste 5% to 7%;
- sugar 5% to 7%;
- salt 0.50% to 1.50%;
- garlic powder 0.03% to 0.070%; and
- white pepper 0.006% to 0.018%.

4. The vacuum-packed fish product of claim 3, wherein said cooking sauce comprises approximately by weight percent:
- water 86.95%;
- tomato paste 6.03%;
- sugar 6.09%;
- salt 0.87%;
- garlic powder 0.048%; and
- white pepper 0.012%.

5. The vacuum-packed fish product of claim 4, wherein said tomato paste consists of pressed tomatoes.

6. The vacuum-packed fish product of claim 1, wherein said tomato base cooking sauce comprises by weight percent:
- water 80% to 90%;
- tomato paste 6.5% to 8.5%;
- sugar 6.5% to 8.5%;
- salt 0.50% to 1.5%;
- garlic powder 0.03% to 0.10%; and
- white pepper 0.006% to 0.02%.

7. The vacuum-packed fish product of claim 6, wherein said cooking sauce comprises approximately, by weight percent:
- water 84.15%;
- tomato paste 7.36%;
- sugar 7.36%;
- salt 1.05%;
- garlic powder 0.058%; and
- white pepper 0.013%.

8. The vacuum-packed fish product of claim 1, wherein said fish comprises mullet.

9. The vacuum-packed fish product of claim 1, wherein said fish comprises carp.

10. The vacuum-packed fish product of claim 1, wherein said fish consists of mullet.

11. A vacuum-packed fish product provided in a tomato base cooking sauce processed at high temperature and comprising, by weight percent:
- fish 43% to 53%;
- egg 11% to 13%;
- onion 8.5% to 10.5%;
- oil 5.5% to 6.5%;
- potato starch 3.5% to 6.5%;
- sugar 7.0 to 8.5%;
- water 8.0% to 10.5%;
- salt 1.0% to 2.0%; and
- white pepper 0.10% to 0.15%.

12. The vacuum-packed fish product of claim 11, wherein said fish product consists essentially of, by approximate weight percent:
- fish 48.59%;
- egg 12.34%;
- onion 9.64%;
- oil 6.17%;
- potato starch 4.63%;
- sugar 7.71%;
- water 9.26%;
- salt 1.54%; and
- white pepper 0.12%.

13. A method of processing a fish product comprising by weight percent, 43% to 53% fish; 11% to 13% egg, 8.5% to 10.5% onion, 5.5% to 6.5% oil, 4.5% to 6.5% matzo meal, 7.0% to 8.0% sugar, 8.0% to 10.0% water, 1.0% to 2.0% salt, 0.30% to 0.50 potato starch and 0.10% to 0.15% white pepper, wherein said fish product is disposed in a tomato base sauce comprising by weight percent 80% to 90% water, 5% to 7% tomato paste, 5.0% to 7.0% sugar, 0.50% to 1.50% salt, 0.03% to 0.07% garlic powder and 0.006% to 0.018% white pepper, and wherein said method comprises heating said fish product in said tomato base sauce at a temperature above 200° degrees Fahrenheit for a period of about 30 to 45 minutes, placing said fish product and said tomato base sauce in a vacuum sealable container and vacuum sealing said fish product and said tomato base sauce in said vacuum sealable container.

14. A method of processing a fish product comprising by weight percent, 43% to 53% fish; 11% to 13% egg, 8.5% to 10.5% onion, 5.5% to 6.5% oil, 4.5% to 6.5% matzo meal, 7.0% to 8.0% sugar, 8.0% to 10.0% water, 1.0% to 2.0% salt, 0.30% to 0.50% potato starch and 0.10% to 0.15% white pepper, wherein said fish product is disposed in a tomato base sauce comprising by weight percent 80% to 90% water, 6.5% to 8.5% tomato paste, 6.5% to 8.5% sugar, 0.50% to 1.50% salt, 0.03% to 0.10% garlic powder and 0.006% to 0.02% white pepper, and wherein said method comprises heating said fish product in said tomato base sauce at a temperature above 200° Fahrenheit for a period of about 30 to 45 minutes, placing said fish product and said tomato base sauce in a vacuum sealable container and vacuum sealing said fish product and said tomato base sauce in said vacuum sealable container.

15. A method of processing a fish product comprising by weight percent, 43% to 53% fish; 11% to 13% egg, 8.5% to 10.5% onion, 5.5% to 6.5% oil, 3.5% to 6.5% potato starch, 7.0% to 8.5% sugar, 8.0% to 10.5% water, 1.0% to 2.0% salt, and 0.10% to 0.15% white pepper, wherein said fish product is disposed in a tomato base sauce comprising by weight percent 80% to 90% water, 5% to 7% tomato paste, 5.0% to 7.0% sugar, 0.50% to 1.50% salt, 0.03% to 0.07% garlic powder and 0.006% to 0.018% white pepper, and wherein said method comprises heating said fish product in said tomato base sauce at a temperature above 200° Fahrenheit for a period of about 30 to 45 minutes, placing said fish product and said tomato base sauce in a vacuum sealable container and vacuum sealing said fish product and said tomato base sauce in said vacuum sealable container.

16. A method of processing a fish product comprising by weight percent, 43% to 53% fish; 11% to 13% egg, 8.5% to 10.5% onion, 5.5% to 6.5% oil, 3.5% to 6.5% potato starch, 7.0% to 8.5% sugar, 8.0% to 10.5% water, 1.0% to 2.0% salt, 0.10% to 0.15% white pepper, wherein said fish product is disposed in a tomato base sauce comprising, by weight percent, 80% to 90% water, 6.5% to 8.5% tomato paste, 6.5% to 8.5% sugar, 0.50% to 1.50% salt, 0.030% to 0.10% garlic powder and 0.006% to 0.020% white pepper, and wherein said method comprises heating said fish product in said tomato base sauce at a temperature above 200° Fahrenheit for a period of about 30 to 45 minutes, placing said fish product and said tomato base sauce in a vacuum sealable container and vacuum sealing said fish product and said tomato base sauce in said vacuum sealable container.

* * * * *